(12) United States Patent
Ilch et al.

(10) Patent No.: US 7,285,040 B2
(45) Date of Patent: Oct. 23, 2007

(54) METHOD FOR DE-RINDING AND TRIMMING A PIECE OF MEAT OR A PIECE OF SLAUGHTERED ANIMAL

(75) Inventors: Hartmut Ilch, Kehl (DE); Joachin Schill, Kehl (DE)

(73) Assignee: Maja Maschinenfabrik Herman Schill GmbH & Co. KG, Kehl-Goldecheuer (DE)

( * ) Notice: Subject to any disclaimer, the term of this patent is extended or adjusted under 35 U.S.C. 154(b) by 0 days.

(21) Appl. No.: 10/818,409

(22) Filed: Apr. 5, 2004

(65) Prior Publication Data
US 2005/0176357 A1    Aug. 11, 2005

(30) Foreign Application Priority Data
Apr. 4, 2003  (DE)  ................ 103 15 621

(51) Int. Cl.
*A22C 17/00*  (2006.01)
(52) U.S. Cl. .................................... 452/150
(58) Field of Classification Search .............. None
See application file for complete search history.

(56) References Cited

U.S. PATENT DOCUMENTS

| 5,314,375 A | * | 5/1994 | O'Brien et al. ............. 452/157 |
| 5,902,177 A | * | 5/1999 | Tessier et al. ............. 452/156 |
| RE36,664 E | * | 4/2000 | O'Brien et al. ............. 452/157 |

* cited by examiner

*Primary Examiner*—Thomas Price
(74) *Attorney, Agent, or Firm*—Orum & Roth LLC

(57) ABSTRACT

A device and a method are proposed for de-rinding or trimming a piece of meat or piece of a slaughtered animal, in which an arrangement device for the arrangement of the piece, an industrial robot with a manipulator arm and a sensor system, which detects the part that is to be separated, are provided. The sensor system comprises a camera and ail image processing system as well as, if necessary, a distance measuring system, which determines the distance between a predefined zero point and a measuring point on the surface of the piece. Further, a cutting tool is provided, which separates the part from the piece.

45 Claims, 8 Drawing Sheets

METHOD FOR DE-RINDING AND TRIMMING A PIECE OF MEAT OR A PIECE OF SLAUGHTERED ANIMAL

Applicant claims priority of application number 103 15 621.6 filed on 4 Apr. 2003 filed with the German Patent and Trademark Office.

BACKGROUND OF THE INVENTION

1. Field of the Invention

The invention relates a method for de-rinding or trimming a piece of meat or a piece of a slaughtered animal.

2. Description of Related Art

In the processing of a piece of meat or a piece of a slaughtered animal skin, fat, muscles, tendons and rind are removed. If the piece of meat has a relatively uniform thickness, the de-rinding and skinning can take place by means of a machine with the help of a skinning, fleecing and/or de-rinding device. For example, this holds true for a boned belly of pork. The remnants of fat which are left over in the automatic processing of a meat plate or the remnants of meat which are left over in the automatic processing of a plate have up to now been removed by hand. The processor must distinguish between muscle meat and fat. At the edges of the boned belly of pork there are frequently skin folds present. Due to the irregular thickness a post-processing by hand is also necessary at these places. This processing by hand is not only time-consuming and costly, but rather is also connected with a danger of injury for the processor.

The rinding of a boned pork has up to this point also occurred partially by hand. The ham with the foot or the shoulder with the ribs is removed by a processor by hand and guided to the blade of a rinding machine. In the process the ham must be aligned in such a way that the blade can grip the rind during the cutting. As soon as the blade has penetrated the rind, the ham is pressed against and turned to the blade by means of rollers. This represents a high risk of injury for the processor in particular in the region of his hands. In addition processing by hand is connected with high expenses.

SUMMARY OF THE INVENTION

Using the inventive method, irregularly shaped meat pieces or pieces of slaughtered animals can be processed automatically. Additionally, areas accessible only with difficulty can be processed automatically. Previously, irregularly shaped and/or inaccessible areas could only be processed by hand.

The inventive method uses a sensor and optionally a distance measuring system to measure the coordinates of the surface of the meat. The meat is then manipulated by a mechanical arm relative to a stationary cutter or the cutter is manipulated relative to the meat. The undesirable parts are removed from the piece of meat.

DETAILED DESCRIPTION OF THE INVENTION

Figure 1:
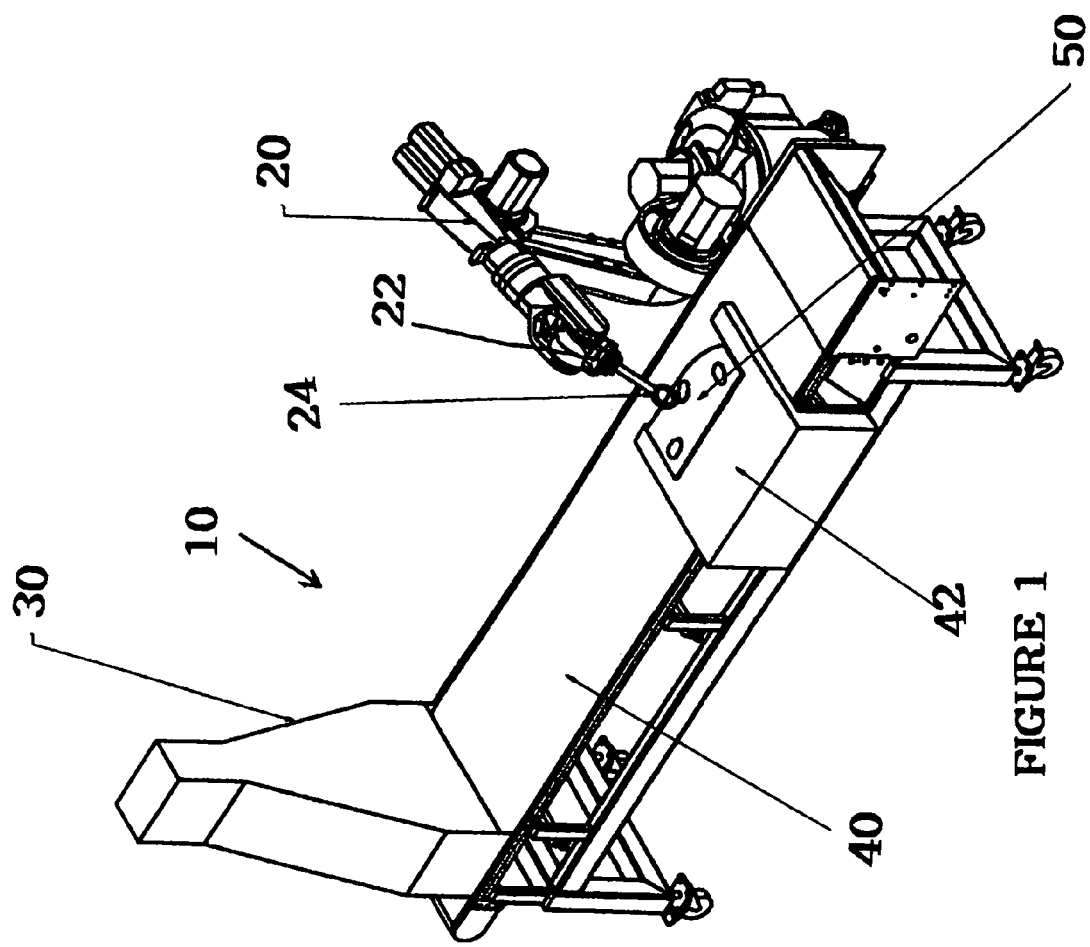
FIG. 1 is an elevated view of the device.
Figure 2:
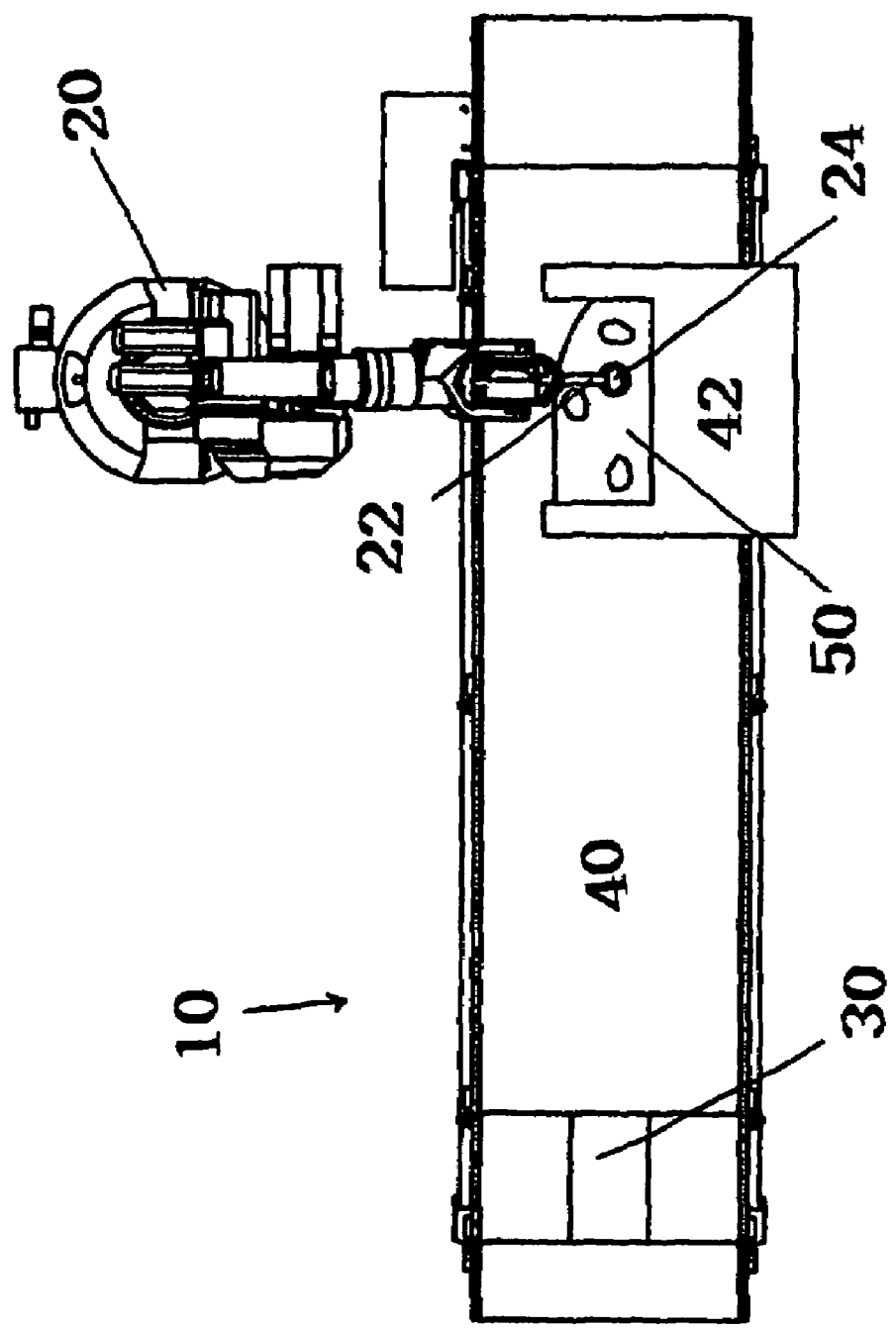
FIG. 2 is a top view of the device.
Figure 3:
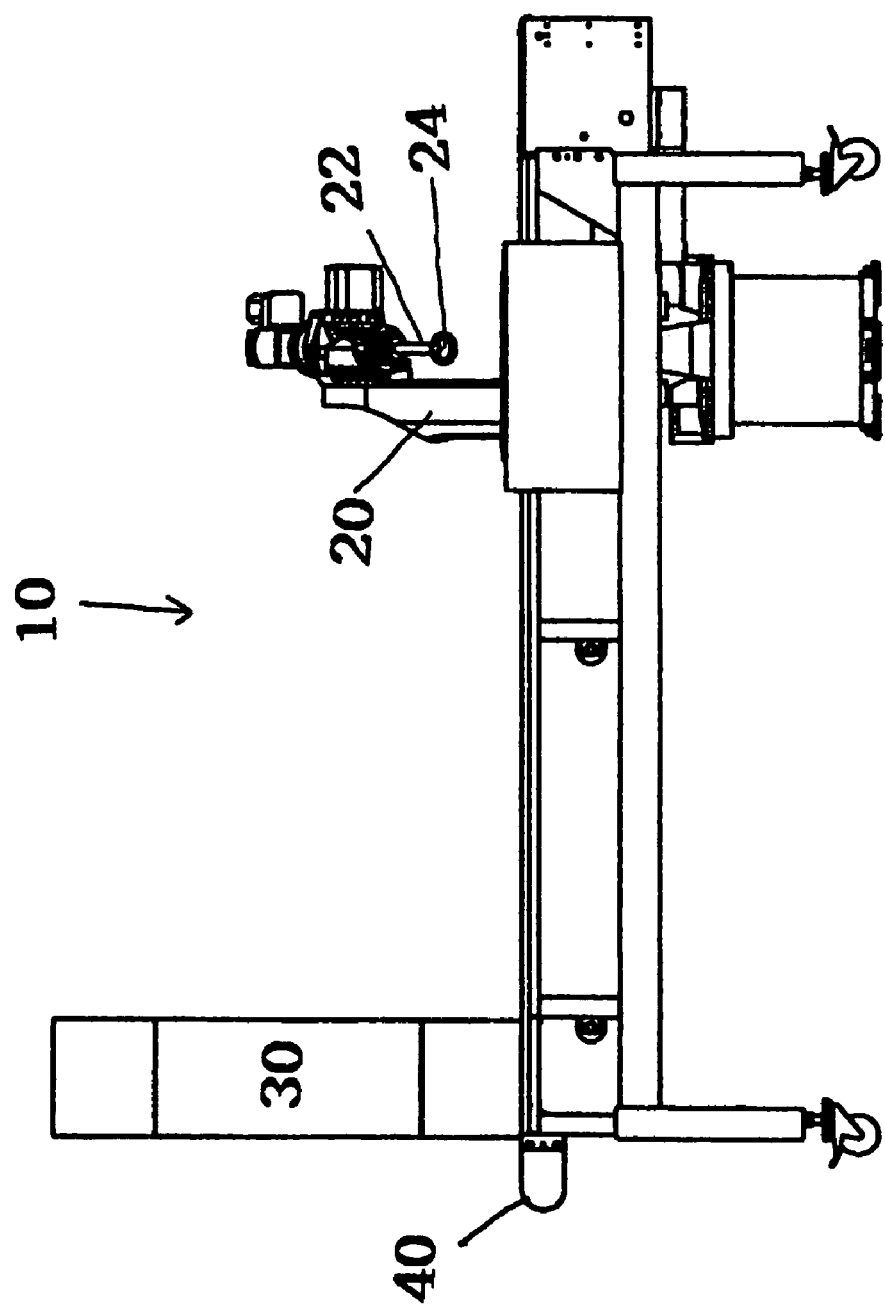
FIG. 3 is a side view of the device.
Figure 4:
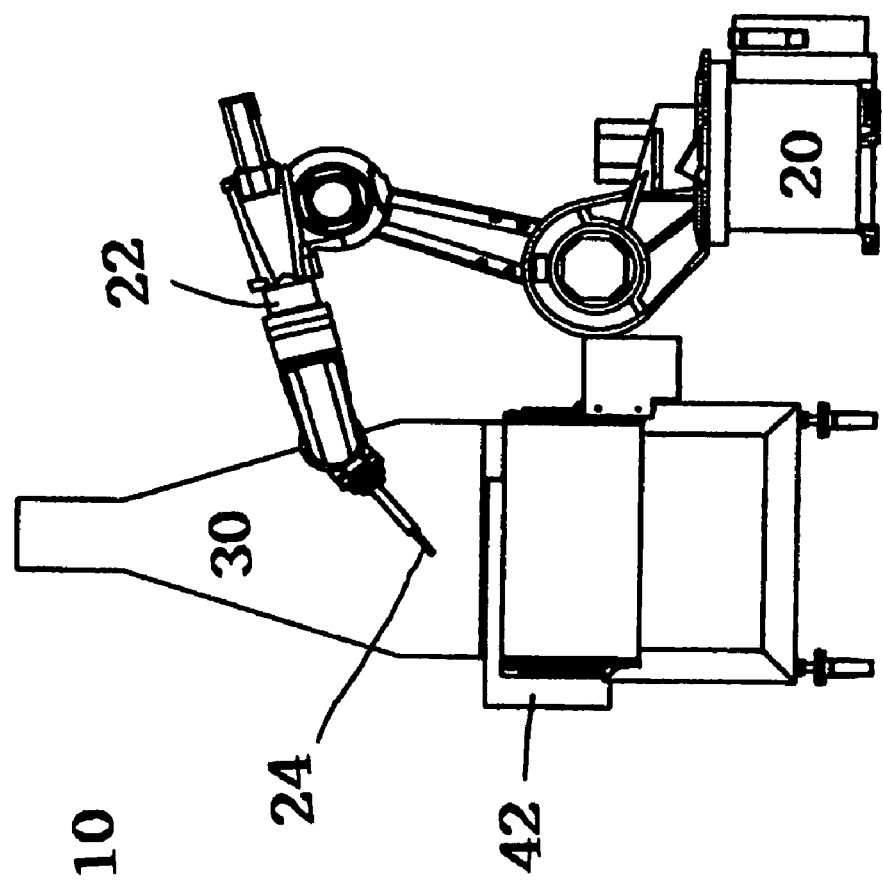
FIG. 4 is an end view of the device.
Figure 5:
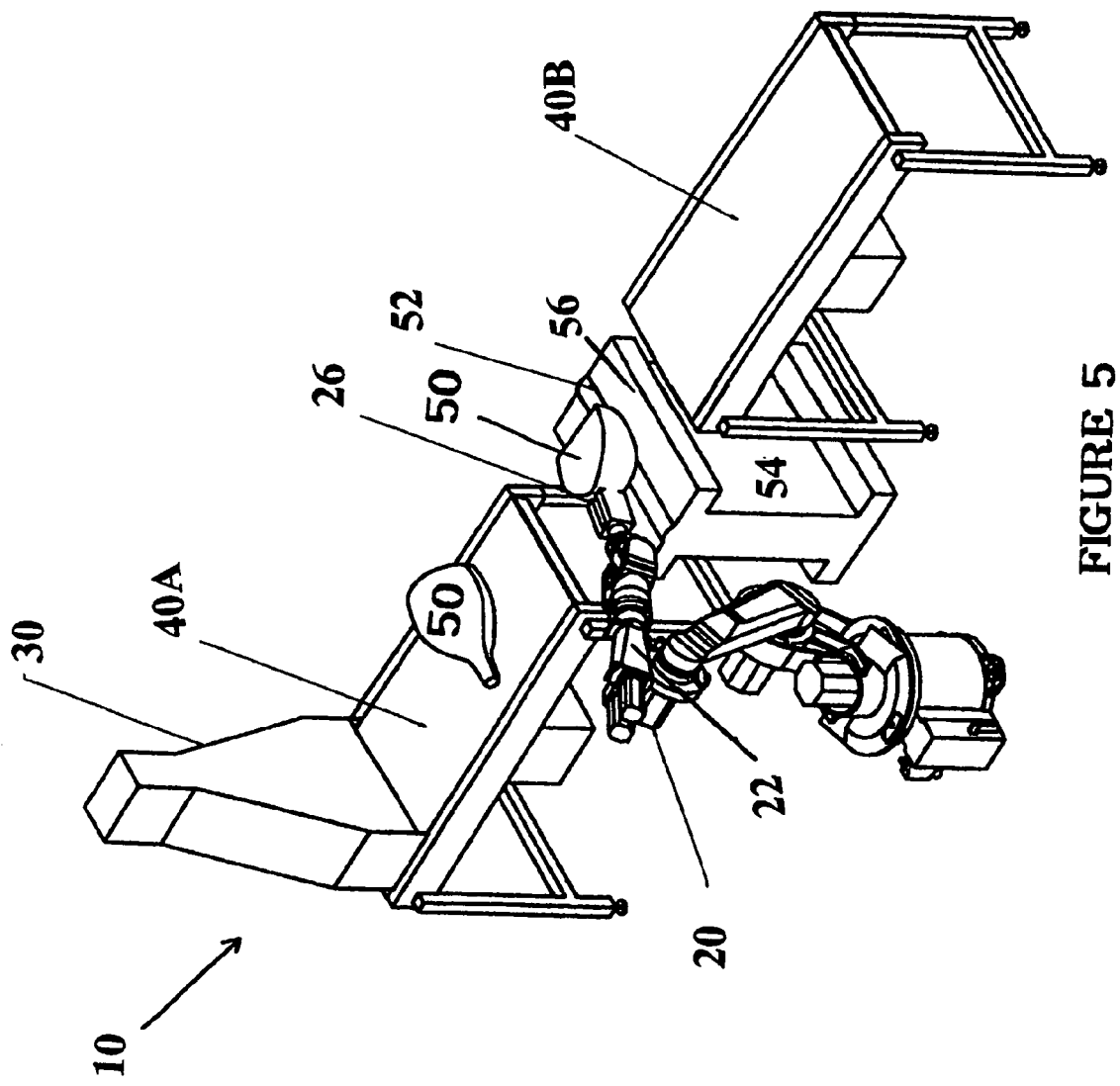
FIG. 5 is an elevated view of the device.
Figure 6:
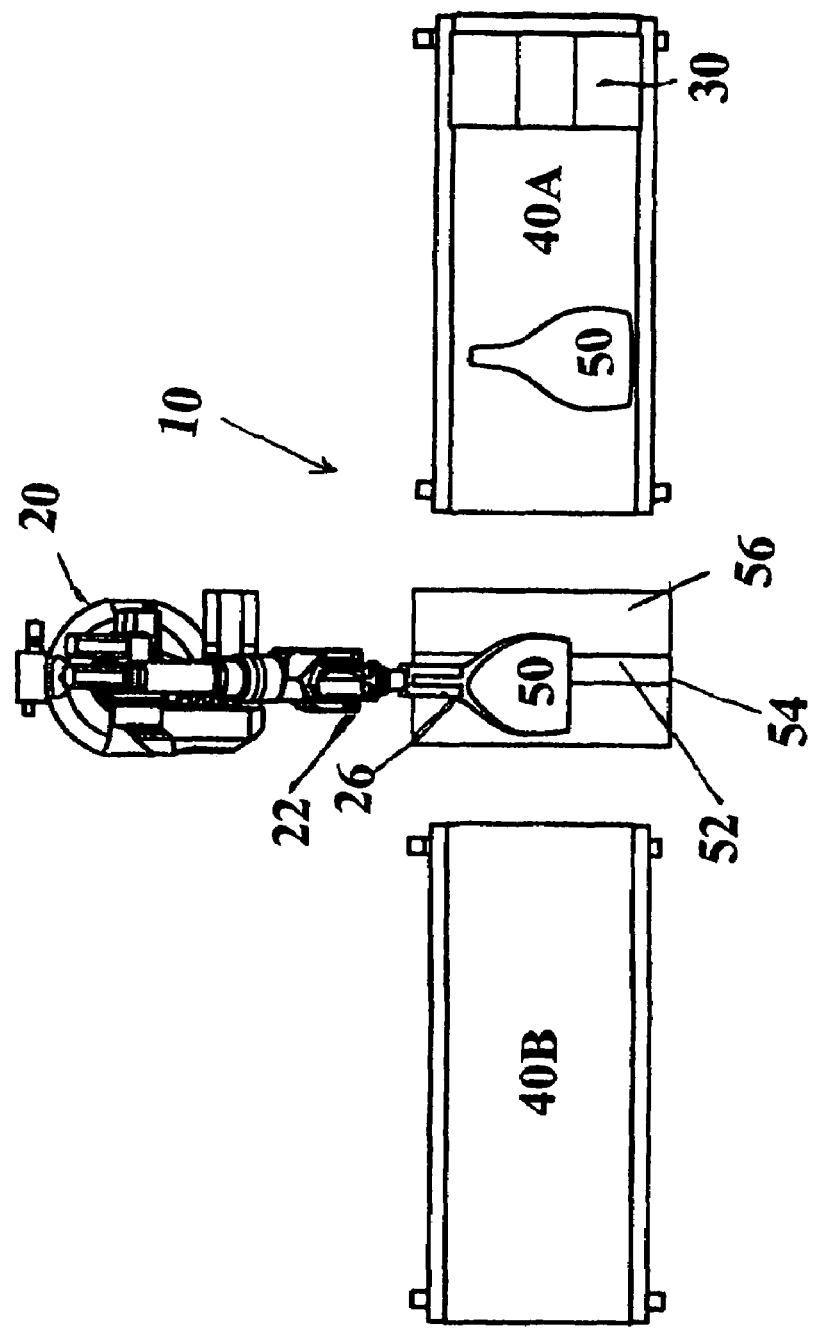
FIG. 6 is a top view of the device.
Figure 7:
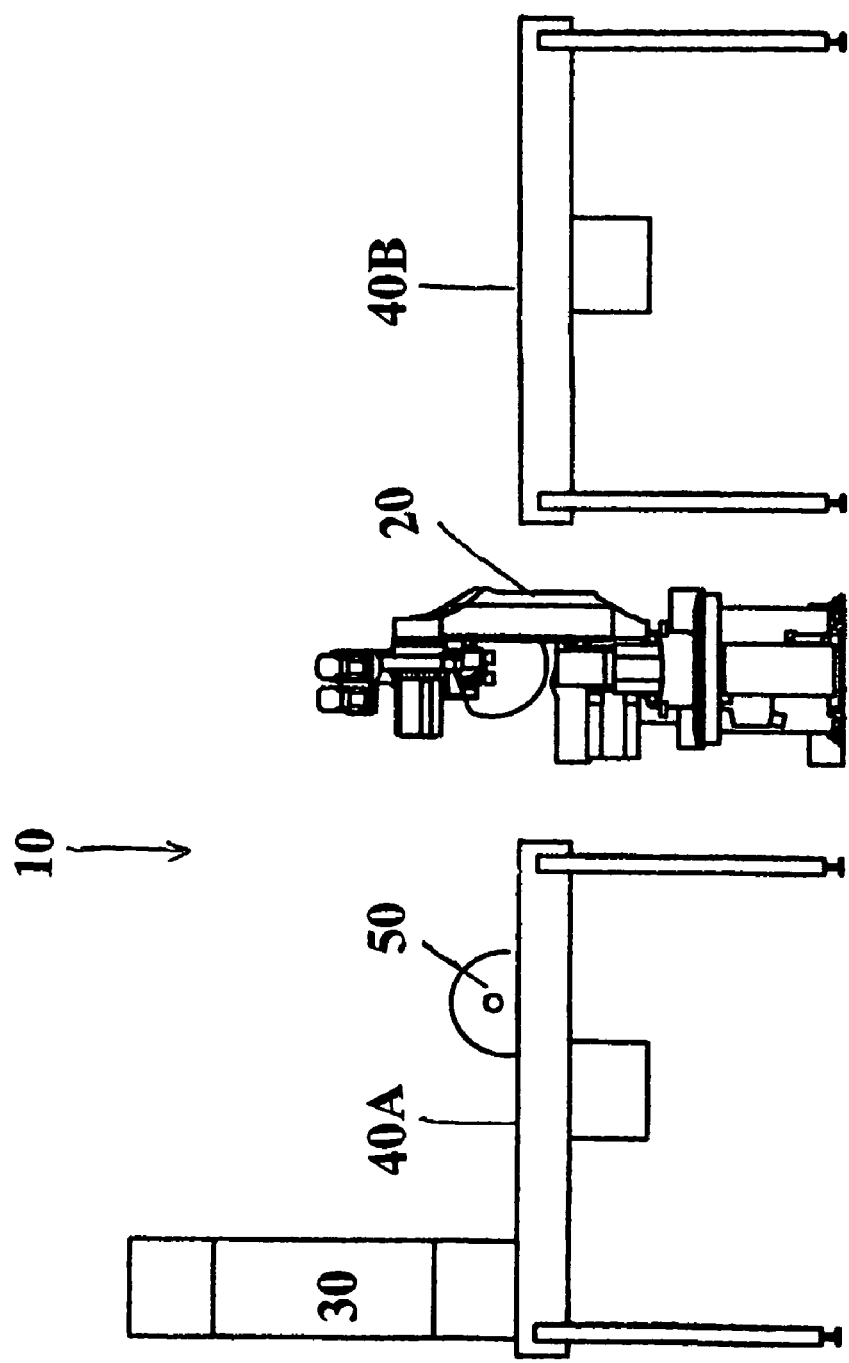
FIG. 7 is a side view of the device.
Figure 8:
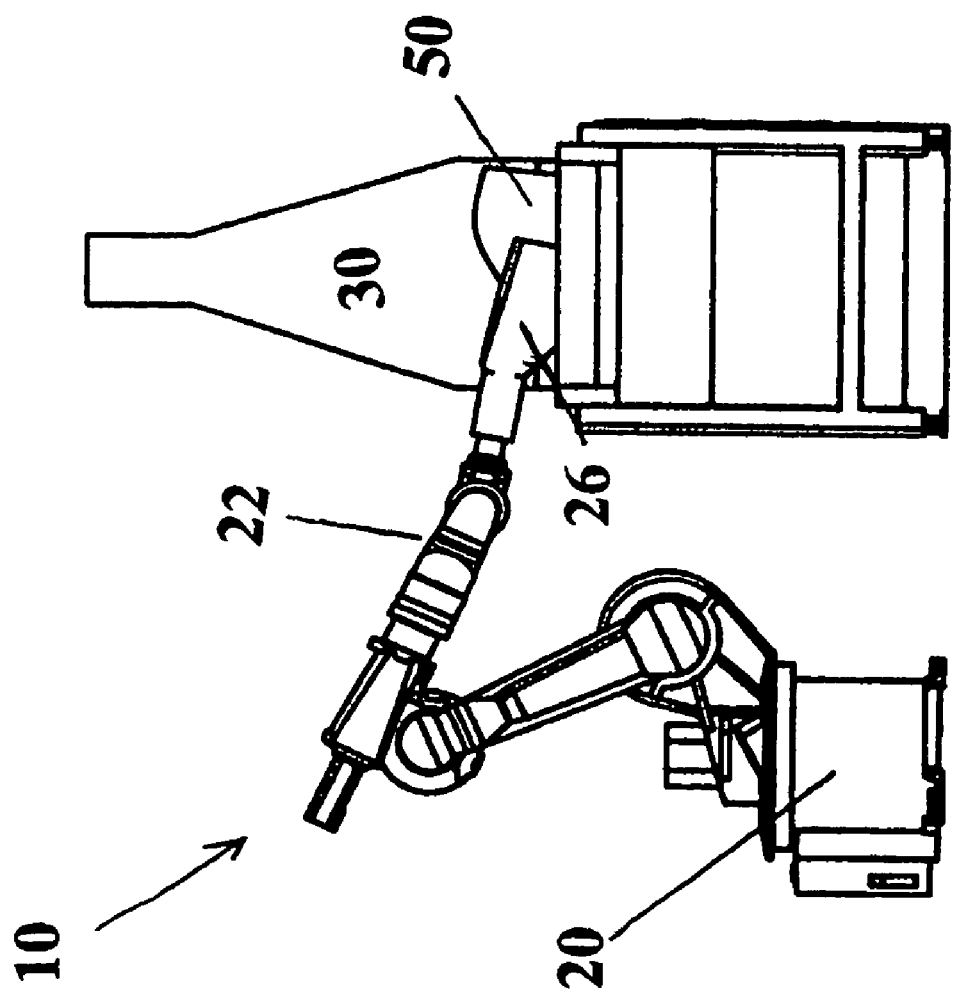
FIG. 8 is an end view of the device.

Using the inventive method, parts to be separated are detected by a sensor system 30. For this purpose a camera with an image processing system and optionally additionally a distance measuring system are provided. The camera and the image processing system record the coordinates of the part to be separated in particular at its surface in two or three dimensions. The distance between the surface and the manipulator arm 22 of the robot 20 are recorded with the image processing system and/or with a distance measuring system. The coordinates of the surface of the part to be separated from the piece 50 are recorded. This recorded data is processed by microprocessors into signals. The signals steer either a cutting tool 24 or a gripper 26 on a manual manipulator arm 22 of an industrial robot 20.

In one embodiment, the manipulator arm 22 guides the cutting tool 24 to the piece 50, which is either resting or moving at a constant speed. With the help of the cutting tool 24 the parts are separated from the piece 50. In an alternative embodiment, the manipulator arm is equipped with a gripper that receives the piece of meat and guides it to a stationary cutting tool. The gripper aligns the piece in such a way that the part can be separated by the cutting tool.

A post-processing by hand is not necessary. To make certain that the undesirable parts have been completely separated, the piece 50 can be examined again after processing using camera and the image processing system. If there are still undesirable remnants on the piece, the cutting tool 24 is activated again. The control of the manipulator arm 22 takes place with the help of a computer.

Using the device of the invention 10, areas of meat pieces or pieces of slaughtered animals can be processed which are irregularly formed or only accessible with difficulty and which thus up to now could only be processed by hand. The inventive method uses a camera and image processor to distinguish between the parts to be separated and the surroundings.

The foodstuff pieces processed with the device of the invention can undergo further processing or packaging after separation of the undesirable pieces.

The industrial robot 20 can either be a robot 20 with a manipulator arm 22 with several degrees of freedom or it can be a Scara robot with a manipulator arm. In the case of the latter robot, the number of degrees of freedom is lower, but is sufficient for some applications.

One advantageous design of the invention provides a sender, a receiver and an evaluation unit. The determination of the distance takes place in a non-contact manner. In the process the sender and receiver can use optical or acoustical signals. For example, a laser range finder can be used.

If the surface of the piece 50 to be processed is nearly level, it is sufficient to determine the distance between a zero point and a measuring point at the surface of the piece 50 in the range of the part to be separated. This holds true for example with a boned belly of pork. The manipulator arm 22 with the cutting tool 24 is then moved a distance which is determined from the measured distance at the surface of the piece 50. The cutting tool 24 is then moved in an area above the surface of the piece 50, which corresponds to the part that is to be separated. The part to be separated can be determined using the camera and the image processing system. The cutting tool 24 is driven in such a way that the part is cut off from the piece 50.

The parts that are to be separated can be remnants of meat or fat, which remain on the surface during the mechanical de-rinding. Such remnants have, up to now, been removed by hand with the help of a trimmer. Such trimmers are knives with a circular rotating blade with a cutting depth setting. Such a knife can be provided on the manipulator arm for the removal of remnants. Since the red muscle meat and the white fat differ from each other sufficiently in color, the areas can be differentiated from each other with the help of the camera and the image processing system. The thickness of the area can be determined at least approximately from the size of the areas to be separated. The cutting depth is adjusted in accordance with the thickness. The manipulator arm 22 equipped with a trimmer moves along the surface and separates the remnants from the piece 50.

A disk-shaped rotating blade can also be used in place of a trimmer with a circular blade. In addition, other knives which perform oblique shearing or which are operated with a sawing motion may be used.

A further advantageous design of the invention provides three senders and one receiver, in order to determine the distance between three measuring points and one prescribed zero point. In situations where the surface of the piece is not level, such as for example is the case with the outward pointing surface of a slaughtered animal half, it is not sufficient to only determine the distance between the surface and a zero point. It is also necessary to determine the shape of the piece at the area that is to be processed.

The shape of the piece 50 is determined by determining the distance between three measuring points and one zero point. In the process, the three measuring points must not be located on a line. The rise and fall in the examined area can be determined from these data. This results in not only the distance which the cutting tool 24 must travel to the surface of the piece but also in the angle at which the cutting tool 24 must be applied at the surface. Such processing is, for example, necessary for de-rinding along the cutting lines of a half of a slaughtered pig.

Along the cutting lines the slaughtered animal is divided into several larger pieces. Up to now, for example the belly of pork is not flayed until after the removal of the bones. However, this has the disadvantage that the edges of the belly of pork exhibit skin folds and therefore cannot be completely de-rinded/flayed by machine. There are always skin remnants on the edges. Using the inventive device 10 and method the pork halves can be flayed along the cutting lines prior to further cutting and removal of the bones of the belly of pork. The cutting lines that delimit the belly of pork, where skin folds occur, are located at the shoulder and above the hind leg. In order to flay in these regions, the suspended half of the slaughtered animal is attached to a plate 42 with the help of clips. The plate 42 is of a color that differs greatly from the color of the pork, for example blue. The camera and the image processing system detect the regions that are to be processed using the outlines of the pork half. Using the data from the range measurement the cutting tool 24, a de-rinding device, is guided to the surface and contacts the surface at the determined angle. In guiding the de-rinding device above the surface of the slaughtered animal the angle is, if necessary, varied during the cutting or derinding process corresponding to the shape of the surface.

The shape of the surface can also be determined with a camera and an image processor instead of using a distance measuring system.

The de-rinding and skinning device can be a mobile device, as used to flay by hand. In addition it is possible to use a stationary de-rinding and skinning device 54. When using a stationary skinning and/or de-rinding device, the piece is moved to the blade 52 with the help of a gripper 26. This is not appropriate in the case of a slaughtered animal half, however stationary de-rinding devices are suitable for belly pieces, hams or shoulders that have already been boned.

The stationary skinning and de-rinding devices are based on the principle that a drawing roller a material to be processed, such as a piece of meat 50, is pressed against a blade 52 and moved toward the blade 52. In the process, the part of the material located between the blade and the drawing roller is cut off. The thickness of the layer that has been cut off can be predefined by the distance between the drawing roller and the blade 52. Depending on the thickness and type of layer that has been cut off, one speaks of de-rinding, skinning or fleecing.

To de-rind a ham with feet or a shoulder with ribs the piece is aligned on a base support 56 in a predefined position. Using the camera and the image processing system the rind and the position where the blade 52 of a de-rinding device should contact the piece, are determined. Then a gripper 26 arranged on the manipulator arm 22 of the industrial robot grips the piece 50 and feeds it to a stationary de-rinding device. As soon as the blade 52 of the de-rinding device has penetrated the rind, the piece is transported with the help of the drawing roller. The gripper 26 can therefore disengage from the piece 50 and does not pick it up again until the de-rinding has been completed.

A further advantageous design of the invention provides a conveyor belt as an arrangement device. It serves the purpose of transporting the piece from one processing station to the next. The piece 50 lying on the conveyor belt 40 can be analyzed by the sensor system 30, which is located above. For this purpose, the transport can be paused. The manipulator arm 22 of the industrial robot 20 holds or processes the piece 50. If the piece 50 remains on the conveyor belt 40 during the processing, it can be further transported on the conveyor belt 40 after conclusion of the processing.

A further advantageous design of the invention provides a suction device, which suctions the parts that have been cut off. The parts can subsequently be collected and if necessary processed further.

In accordance with a further advantageous design of the invention the industrial robot is equipped with a cleaning device. For example, the cleaning device can be a steam cleaning device with a spray lance. Therewith the device can itself perform a cleaning of its parts that come into contact with the foodstuff pieces as well as the surroundings.

Further advantages and advantageous designs in the invention can be inferred from the claims.

All features of the invention can be essential to the invention both individually as well as in random combination with one another.

The invention claimed is:

1. Device for cutting one or more parts of a meat piece or a piece of slaughtered animal, comprising:
   an arrangement device for the piece,
   an industrial robot with a manipulator arm,
   a sensor system adapted to detect coordinates of a part to be separated, said coordinates defining a surface of the piece of meat,
   said sensor system comprises a camera and an image processing system, and
   a cutting tool adapted to separate the part from the piece, and
   wherein the cutting tool comprises a skinning and/or de-rinding device.

2. Device according to claim 1 wherein the sensor system further comprises a distance measuring system, said distance measuring system adapted to determine the distance between a predefined zero point and a measuring point on the surface of the piece.

3. Device according to claim 2, wherein the distance measuring system comprises a sender, a receiver and an evaluation unit.

4. Device according to claim 3, wherein the sender comprises an optical or acoustical sender and the receiver comprises an optical or acoustical receiver.

5. Device according to claim 2, wherein the distance measuring system comprises three senders and receivers adapted to determine in a non-contact manner of the distance between the zero point and three measuring points on the surface of the piece.

6. Device according to claim 2 wherein the cutting tool is provided on the manipulator arm.

7. Device according to claim 6 wherein the arrangement device comprises a conveyor belt.

8. Device according to claim 7 further comprising a suction device adapted to suction the separated part.

9. Device according to claim 6 further comprising a suction device adapted to suction the separated part.

10. Device according to claim 1, wherein the cutting tool is provided on the manipulator arm.

11. Device according to claim 10, wherein the cutting tool comprises a knife.

12. Device according to claim 11, wherein the knife exhibits a circular or disk-shaped rotating blade.

13. Device according to claim 1, wherein the arrangement device comprises a conveyor belt.

14. Device according to claim 1, wherein the arrangement device comprises a plate and several clips for attachment of the piece to the plate.

15. Device according to claim 14, wherein the plate exhibits a color different from the color of the piece.

16. Device according to claim 14 further comprising a suction device adapted to suction the separated part.

17. Device according to claim 1, wherein
the arrangement device comprises a conveyor belt,
the cutting tool is a stationary skinning or de-rinding device and
the device further comprises a gripper provided on the industrial robot, said gripper adapted to pick up the piece of meat from the conveyor belt and to feed the piece to the cutting tool.

18. Device according to claim 17 further comprising a suction device adapted to suction the separated part.

19. Device according to claim 1, further comprising a suction device adapted to suction the separated part.

20. A method for de-rinding or trimming a piece of meat or a piece of slaughtered animal comprising following procedure steps:
arranging or suspending and fixing the piece on a base support,
utilizing a camera and an image processing system to determine at least two dimensions of a part to be separated during de-rinding or trimming,
determining two or three dimensions of the part to be separated,
a guiding the cutting tool to the surface of the piece with a manipulator arm of an industrial robot in correspondence to the determined dimensions,
moving the cutting tool along the surface in the area of the part to be separated, and
suctioning away the separated part,
wherein the cutting tool comprises a skinning and/or de-rinding device.

21. The method of claim 20, further comprising the step of determining the distance between a predefined zero point and a measuring point on the surface of the piece.

22. The method of claim 21 wherein the distance is determine using a distance measuring system.

23. The method of claim 21 further comprising the step of guiding the cutting tool to the surface of the piece with a manipulator arm of an industrial robot in correspondence to the determined dimensions and the determined distance.

24. The method of claim 21 further comprising the step of determining the shape of the piece, wherein the shape is determined by determining the distance between the predefined zero point and three measuring points on the surface of the piece.

25. The method of claim 20 further comprising the step of transporting the piece between the camera and image processing system and a cutting location.

26. The method of claim 25 further comprising the step of conveying the part to the camera and image processing system.

27. The method of claim 26 further comprising the step of pausing the piece under the camera and image processing system.

28. The method of claim 26 further comprising the step of conveying the piece away from the cutting tool after the part has been separated.

29. The method of claim 26 further comprising the steps of conveying the piece to the camera and image processing system after the part has been separated and evaluating whether there is a second part to be removed.

30. The method of claim 20 further comprising the step of determining the shape of the piece.

31. The method of claim 30 further comprising the step of optically determining the shape of the object utilizing the camera and image processing system.

32. The method of claim 30 further comprising the step of adjusting the angle of the cutting tool based on the shape of the piece.

33. The method of claim 32 further comprising the step of varying the angle of the cutting tool while moving the cutting tool along the surface.

34. The method of claim 20 further comprising the steps of determining the thickness of the part to be separated and adjusting the cutting depth.

35. The method of claim 20 further comprising the step determining a color difference and using the color difference to determine the part.

36. The method of claim 35, wherein the color difference is between muscle and fat and/or the color difference is between the piece and a plate.

37. The method of claim 20 further comprising the step of attaching the meat to a plate with clips before the cutting tool is moved along the surface.

38. A method for de-rinding a piece of meat comprising the following steps:
arranging the piece on a base support,
utilizing a camera and an image processing system to determine at least two dimensions of a part to be separated during de-rinding or trimming,
determining two or three dimensions of the part to be separated,
picking up the piece with a gripper
aligning the piece in correspondence with the determined data dimensions, and
feeding the piece at this alignment to a de-rinding device, and
suctioning away the separated part.

39. The method of claim 38 further comprising the step of determining the distance between a predefined zero point and a measuring point of the surface of the piece.

40. The method of claim 39 wherein the distance is determined using a distance measuring system.

41. The method of claim 39 further comprising the step of aligning the piece in correspondence with the determined dimensions and distance.

42. The method of claim 38 further comprising the step of separating the part from the piece utilizing the cutter.

43. The method of claim 38 further comprising the step of disengaging the gripper when the piece is penetrated by a blade of the de-rinding device.

44. The method of claim 43 further comprising the step of drawing the piece into the blade with a roller arm.

45. The method of claim 44 further comprising the step of reengaging the gripper after the part has been separated from the piece.

* * * * *